United States Patent [19]
Morgan

[11] Patent Number: 5,932,265
[45] Date of Patent: Aug. 3, 1999

[54] METHOD AND APPARATUS FOR TREATING RAW FOOD

[76] Inventor: Arthur I. Morgan, 1620 Spruce St., Berkeley, Calif. 94709

[21] Appl. No.: 09/086,675

[22] Filed: May 29, 1998

[51] Int. Cl.⁶ ..................................................... A23B 4/00
[52] U.S. Cl. ............................... 426/511; 99/472; 99/516; 426/312; 426/521
[58] Field of Search .................................... 426/312, 404, 426/486, 511, 521, 644; 99/472, 516; 141/65, 66; 422/11

[56] References Cited

U.S. PATENT DOCUMENTS

| | | | |
|---|---|---|---|
| 4,062,646 | 12/1977 | Lodige et al. | 426/521 |
| 4,844,933 | 7/1989 | Hsieh et al. | 426/521 |
| 5,213,029 | 5/1993 | Yutaka | 99/474 |
| 5,268,185 | 12/1993 | Bender et al. | 426/92 |
| 5,281,428 | 1/1994 | Morgan | 426/312 |
| 5,344,609 | 9/1994 | Long | 426/521 |
| 5,368,872 | 11/1994 | Davis, Jr. | 99/472 |
| 5,403,602 | 4/1995 | Endico | 426/231 |
| 5,433,142 | 7/1995 | Roth | 99/474 |
| 5,439,694 | 8/1995 | Morris, Jr. | 426/511 |
| 5,458,901 | 10/1995 | Engler et al. | 426/521 |
| 5,460,845 | 10/1995 | Delmasso et al. | 426/321 |
| 5,514,403 | 5/1996 | Webb et al. | 426/511 |
| 5,523,053 | 6/1996 | Dudek | 426/521 |
| 5,593,714 | 1/1997 | Hirsch | 426/324 |
| 5,641,530 | 6/1997 | Chen | 426/321 |
| 5,711,981 | 1/1998 | Wilson et al. | 426/511 |

FOREIGN PATENT DOCUMENTS

| | | |
|---|---|---|
| 269257 | 1/1992 | European Pat. Off. . |
| 271915 | 5/1992 | European Pat. Off. . |
| 2422907 | 11/1975 | Germany . |

*Primary Examiner*—George Yeung
*Attorney, Agent, or Firm*—Richard C. Litman

[57] ABSTRACT

The present invention is a surface pasteurizer and method for treating the surface of raw foods, by exposing the surface to a treatment gas in the absence of air, so rapidly and ending the treatment, by streaming the treatment gas back into vacuum, so rapidly that the interior of the food is unaffected by treatment and so that the pasteurizer is able to process a high volume of food in a given time period. The treatment may have for its object (1) killing surface microorganisms on such items as meat, seafood, fruit, vegetables, and packaging materials; (2) firming the surface layer over a sensitive interior on such items as encapsulated liquids, permeation membranes, and edible coated objects; or (3) weakening the surface layer over a sensitive interior in order to more easily remove the surface layer on such items as peeled grains, fruit and vegetables. The apparatus and method provide for (1) inserting the food into the apparatus, flushing the food with low pressure air-free steam during insertion; (2) exposing the food to a vacuum; (3) exposing the food to an air-free treatment gas; (4) exposing the food to a vacuum to remove the air-free treatment gas; and (5) expelling the food from the apparatus.

15 Claims, 6 Drawing Sheets

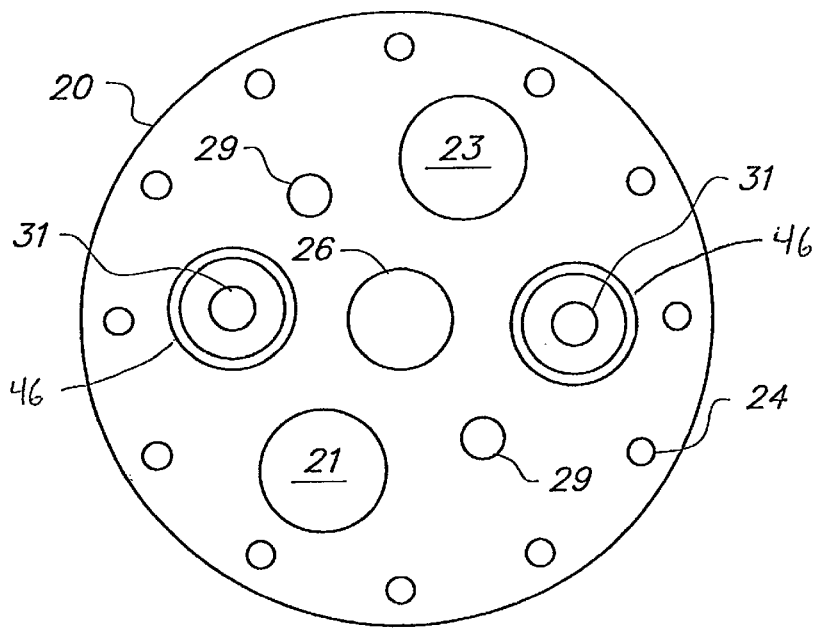
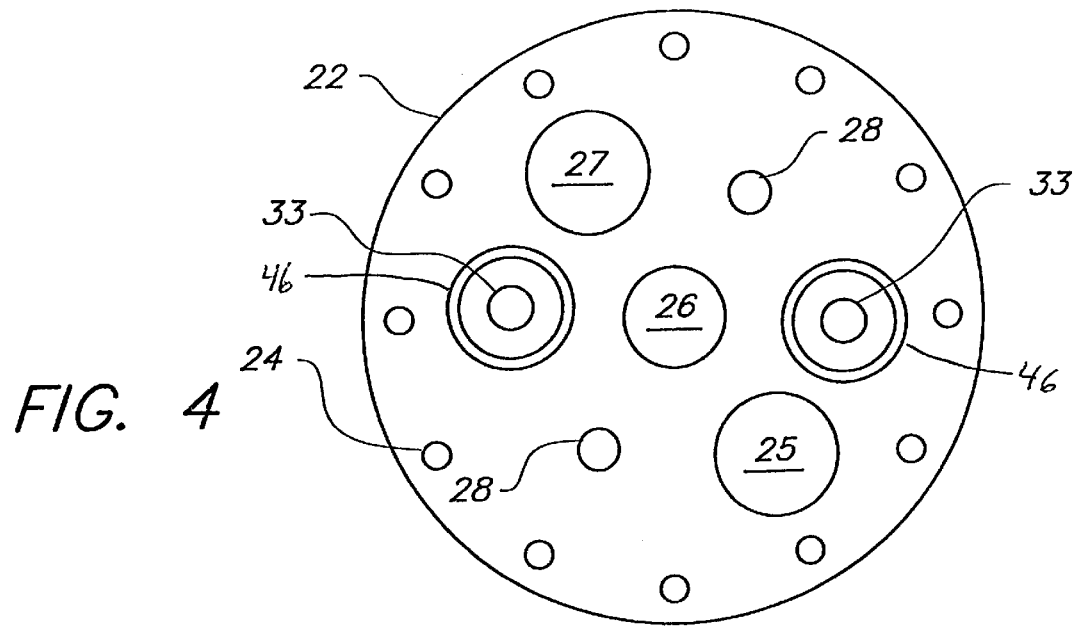

5,932,265

METHOD AND APPARATUS FOR TREATING RAW FOOD

BACKGROUND OF THE INVENTION

1. Field of the Invention

The present invention relates to apparatus for processing raw foods for packaging, and particularly to methods and apparatus for killing surface microorganisms and treating the surface layer of foods such as meats, seafood, grains, fruits and vegetables. For purposes of this application, the apparatus may be referred to as a surface pasteurizer, although treatment of the surface layer may be primarily for purposes other than sterilization.

2. Description of the Related Art

Various methods and apparatus have been developed in recent years for sterilizing or otherwise treating raw foods, some of which employ treatment with liquids others with gases, some at high pressure, others at atmospheric pressure, and still others under vacuum.

German Patent No. 2,422,907, published Nov. 20, 1975, discloses a method and apparatus for sterilizing bulk goods (flour, cocoa, filler material for cosmetics and pharmaceuticals, etc.) using superheated steam, holding the goods at rest in an after sterilization zone at the sterilization temperature. European Patent 269,257, published Jan. 22, 1992, shows a method for sterilizing herbs and spices by exposure to steam at 5–50 psi for 10 seconds to 5 minutes, followed by insertion into a second vessel under vacuum, chilling by a water cooled jacket, and increasing to atmospheric pressure by adding nitrogen. European Patent 271,915, published May 20, 1992 shows an apparatus and method of sterilizing root and tuber vegetables in slices or pieces less than 7 mm by steam treatment under pressure.

U.S. Pat. No. 5,213,029, issued to Hideki Yutaka May 25, 1993, discloses an apparatus for treating foods under high pressure applied by a liquid pressure medium. U.S. Pat. No. 5,268,185, issued Dec. 7, 1993 to Bender, et al., teaches treatment of red meat with a solution of alkali metal organophosphates to remove bacterial contamination. U.S. Pat. No. 5,344,609, issued Sep. 6, 1994 to Marshall Long, shows a method and apparatus of treating sliced and chunked foods by steam under pressure, reducing pressure in successive stages to emit steam until room temperature is reached. U.S. Pat. No. 5,368,872, issued Nov. 29, 1994 to Don M. Davis, Jr. shows an apparatus for smoking meats under pressure and under vacuum, where pressure, temperature and smoke concentration are controlled.

U.S. Pat. No. 5,403,602, issued Apr. 4, 1995 to Felix W. Endico, teaches treatment of viscous (tuna salad, egg salad, shrimp salad) and semi-viscous (catsup, pickle relish, sauces and salad dressings) food products with ozone in a mixer or blender. U.S. Pat. No. 5,433,142, issued Jul. 18, 1995 to Eldon Roth discloses using a working gas, such as $CO_2$, $N_2$, $O_2$, or $H_2$ under pressure from 10 psig to 4,000–5,000 psig. U.S. Pat. No. 5,439,694, issued Aug. 8, 1995 to William F. Morris, Jr., shows processing poultry in a steam chamber after evisceration and before chilling long enough to kill salmonella. U.S. Pat. No. 5,458,901, issued Oct. 17, 1995 to Engler, et al., teaches introducing meat to a pressure vessel, removing air to create a vacuum, introducing $CO_2$ at 350–400 psig and 32–36° F. for 15 minutes to form carbonic acid, and rapidly depressurizing the vessel.

U.S. Pat. No. 5,460,845, issued Oct. 24, 1995 to Delmassa, et al., shows treating the surface of seeds, nuts, grains, fruits and spices in a dehumidifying chamber, exposing the food to $H_2O_2$ and $H_2O$ vapor under vacuum, followed by removing the peroxide to 38 mm Hg, followed by increasing the pressure to 400–580 mm Hg, for a 3–30 minute exposure. U.S. Pat. No. 5,514,403, issued May 7, 1996 to Webb, et al., teaches killing bacteria on animal carcasses by spraying with superheated steam at 250–300° F. for 1–5 seconds followed immediately by spraying with a cooling liquid for 5–10 seconds. U.S. Pat. No. 5,523,053, issued Jun. 4, 1996 to Daniel H. Dudek, describes sterilizing spices or herbs by dropping the material into pressurized steam sterilization chambers successively for a predetermined period of time, followed by gradual depressurization to atmospheric pressure.

U.S. Pat. No. 5,593,714, issued Jan. 14, 1997 to Gerald P. Hirsch, describes placing a food product in a compressible package at 25,000 psi and 18–23° C. at least 5 days, optionally adding an anti-oxidant. U.S. Pat. No. 5,641,530, issued Jun. 24, 1997 to T. C. Chen, teaches treating foodstuffs with 0.005% to 0.035% $H_2O_2$ and 0.005 to 0.1% $H_3PO_4$ or $C_6H_5COOH$. U.S. Pat. No. 5,711,981, issued Jan. 27, 1998 to Wilson, et al., describes treating meats by removing surface water by air blowing, steam heating at pressure greater than atmospheric, and chilling by spraying with water.

All of these techniques have suffered from one or more of the following problems: (1) denaturation of meat protein, (2) insufficient bacterial kill, (3) deleterious color change, (4) unacceptable flavor modification, and (5) inadequate control of the process in large scale operations.

A previous patent to the present inventor, Arthur I. Morgan, U.S. Pat. No. 5,281,428, issued Jan. 25, 1994, described a method and apparatus for killing microorganisms on the surface of raw meat, the method comprising the steps of (1) exposing the meat to a vacuum; (2) flushing the surface with an air-free treatment gas; (3) treating the meat surface with air-free treatment gas; and (4) reexposing the meat to a vacuum. While the method and apparatus described therein are effective in accomplishing the object of killing surface microorganisms without substantial change in the interior of the meat product, nevertheless, in practice the method and apparatus require significant and unobvious modifications and adaptations to produce a practical and economical apparatus serviceable in the industry.

For example, the method as set forth in '428 called for exposing the raw meat to a vacuum and then flushing the surface of the meat with an air-free gas prior to treatment in order to further remove air from the pores, close to the surface of the meat so that the treatment gas is more quickly enabled to stream over the surface of the meat to kill microorganisms, thus reducing the exposure time to the treatment gas and reducing the likelihood of cooking or changing the interior of the meat. As set forth more fully below, applying the vacuum prior to flushing requires the vacuum pump to remove air from the treatment chamber at a prodigious rate, engendering frequent mechanical breakdowns, or slowing the treatment process, which makes the apparatus less economical and less desirable from an industrial perspective. It is an object of the present invention to overcome the difficulties and disadvantages of the prior art.

None of the above inventions and patents, taken either singularly or in combination, is seen to describe the instant invention as claimed. Thus a apparatus for treating raw food solving the aforementioned problems is desired.

SUMMARY OF THE INVENTION

The present invention is a surface pasteurizer and method for treating the surface of raw foods, by means of exposing the surface to a treatment gas in the absence of air, so rapidly and ending the treatment, by streaming the treatment gas back into vacuum, so rapidly that the interior of the food is unaffected by treatment and so that the pasteurizer is able to process a high volume of food in a given time period. The treatment may have for its object (1) killing surface microorganisms on such items as meat, seafood, fruit, vegetables, and packaging materials; (2) firming the surface layer over a sensitive interior on such items as encapsulated liquids, permeation membranes, and edible coated objects; or (3) weakening the surface layer over a sensitive interior in order to more easily remove the surface layer on such items as peeled grains, fruit and vegetables. The apparatus and method provide for (1) inserting the food into the apparatus, flushing the food with low pressure air-free steam during insertion; (2) exposing the food to a vacuum; (3) exposing the food to an air-free treatment gas; (4) exposing the food to a vacuum to remove the air-free treatment gas; and (5) expelling the food from the apparatus.

The apparatus comprises a rotor, an upper stator plate and a lower stator plate, a servo drive mechanism attached to the rotor shaft by a roller chain and sprocket which rotates the rotor in 60° steps between the stator plates, a high pressure steam generator, a vacuum source including a condensing receiver, and a computerized control system. The rotor further comprises a circular upper plate and lower plate, a plurality of treatment chambers disposed between the plates, and a hollow, water cooled rotor shaft attached to the center of the rotor plates and passing through bearings in the stator plates. The rotor plates are cut out above and below the treatment chambers and the upper stator plate has at least two openings for insertion of raw food into treatment chambers and the lower stator plate has a least two openings for expelling treated food, separated from the insertion openings in the upper plate by a 120° rotation angle. The apparatus has connections for low pressure steam on the lower stator plate at the insertion positions and on the upper stator plate in the expelling positions. Between the insertion position and the expelling position is a treatment position, having connections to a vacuum and condensing receiver on the upper stator plate, and to a high pressure steam generator on the lower stator plate. The computerized control system activates the servo mechanism to rotate the rotor from an insertion position, to a treating position, to an expelling position, the apparatus treating at least two food pieces per rotation.

Accordingly, it is a principal object of the invention to provide an apparatus for treating the surface of raw food with air-free gas in the absence of air and ending the treatment so rapidly that the interior of the food is largely unaffected by treatment.

It is another object of the invention to provide an apparatus for treating raw food which may be used for killing surface microorganisms, firming the surface layer over a sensitive interior, or weakening the surface layer over a sensitive interior in order to more easily remove the surface layer.

It is a further object of the invention to provide a high speed-high volume surface pasteurizer which is both efficient and economical.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 3 is a plan view of the upper stator plate according to the present invention.

FIG. 4 is a bottom view of the lower stator plate according to the present invention.

Similar reference characters denote corresponding features consistently throughout the attached drawings.

DETAILED DESCRIPTION OF THE PREFERRED EMBODIMENTS

Figure 1:
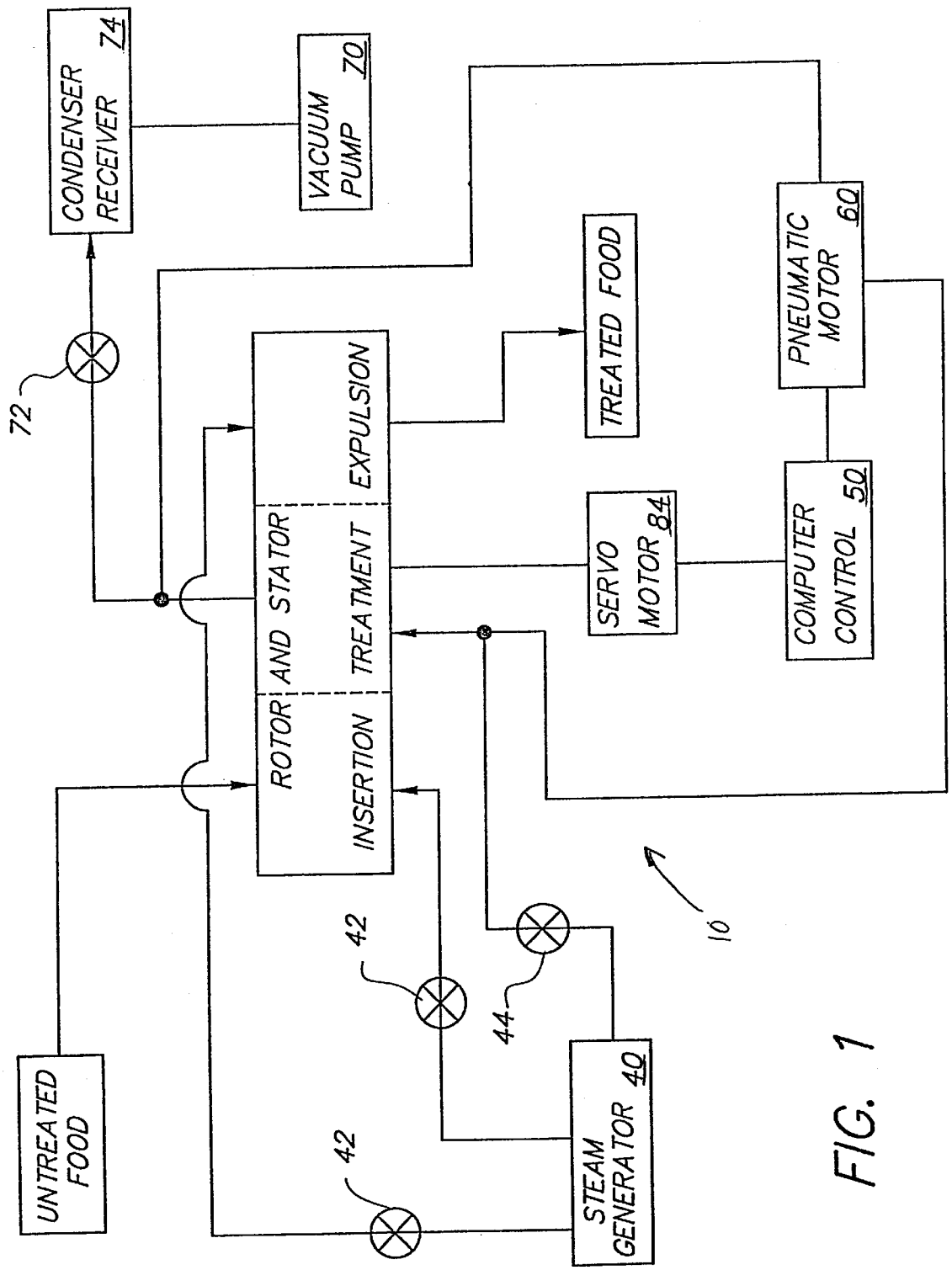
FIG. 1 is a block diagram of an apparatus for treating raw food according to the present invention.

The present invention is a surface pasteurizer, referred to generally in the drawings as 10, for the treatment of raw food products. A block diagram of the apparatus 10 is shown in FIG. 1. Various portions of the apparatus 10 employ devices which are old and well known to those skilled in the art. The invention also includes the rotor and stator assembly 15, its combination with devices conventional in the art, and the method of use of the apparatus 10.

The rotor and stator assembly 15 is shown in more detail in FIGS. 2 through 8. As illustrated in the perspective view shown in FIG. 2, the rotor and stator assembly 15 comprises an upper stator plate 20, shown more fully in FIG. 3, a lower stator plate 22, shown more fully in FIG. 4, and a rotor more fully shown in FIG. 6 and referred to generally as 30. Stator plates 20 and 22 are spaced a fixed distance apart from each other by a plurality of stator spacer bolts 24 in a ring about their circumference at the periphery of the plates 20 and 22.

The rotor 30 comprises a top rotor plate 32 and a bottom rotor plate 34, both of which are concentric with and fixedly attached to a hollow rotor shaft 36, and both of which are somewhat smaller in diameter than stator plates 20 and 22. Rotor plates 32 and 34 are spaced a fixed distance apart from each other by a plurality of rotor spacer bolts 38 in a ring about their circumference, the ends of the bolts 38 being flush with the outer surfaces 33 of the rotor plates 32 and 34, and the length of the bolts 38 being slightly shorter than the distance between upper stator plate 20 and lower stator plate 22.

Figure 2:
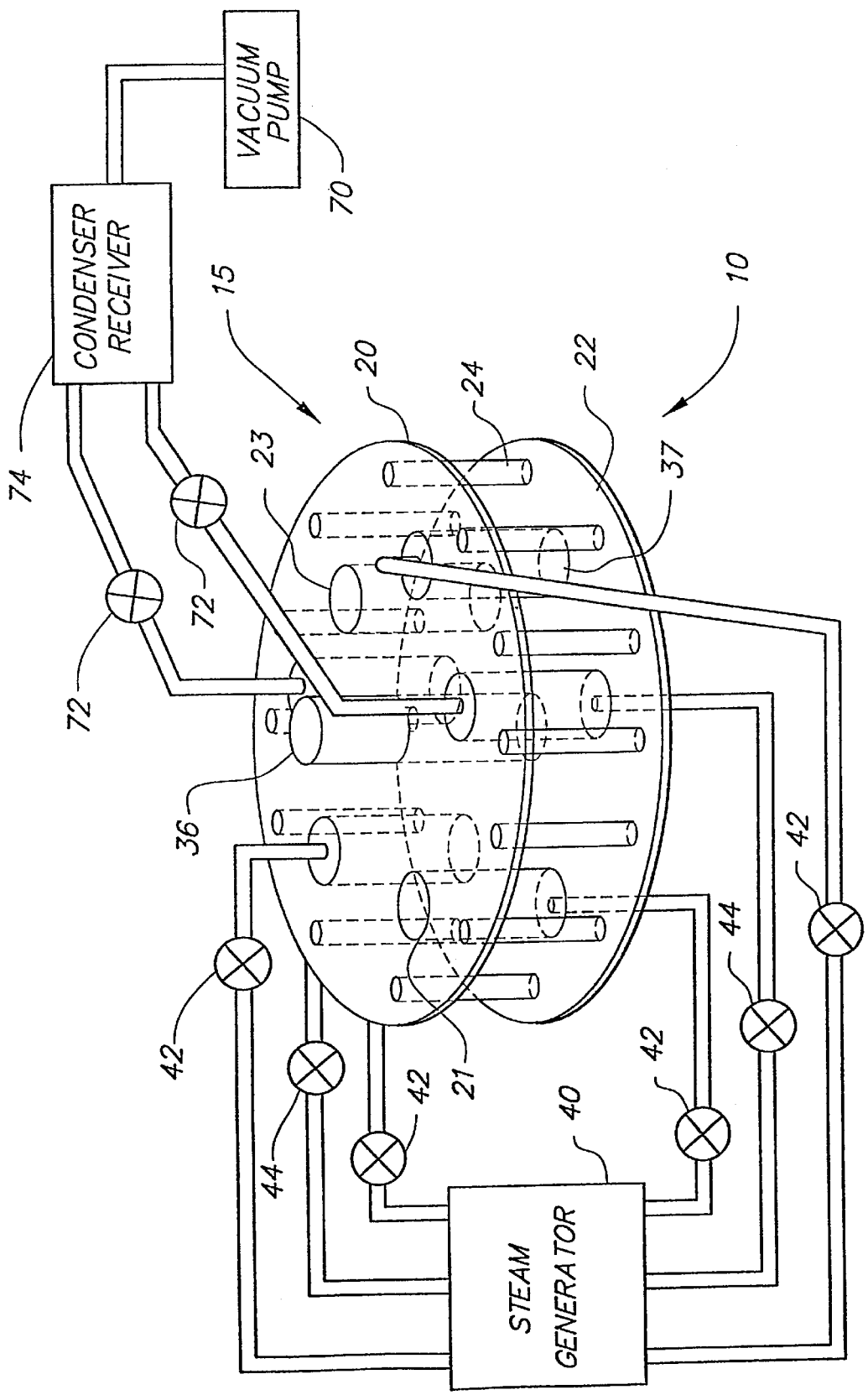
FIG. 2 is a top perspective view of an apparatus for treating raw food according to the present invention.
Figure 5:
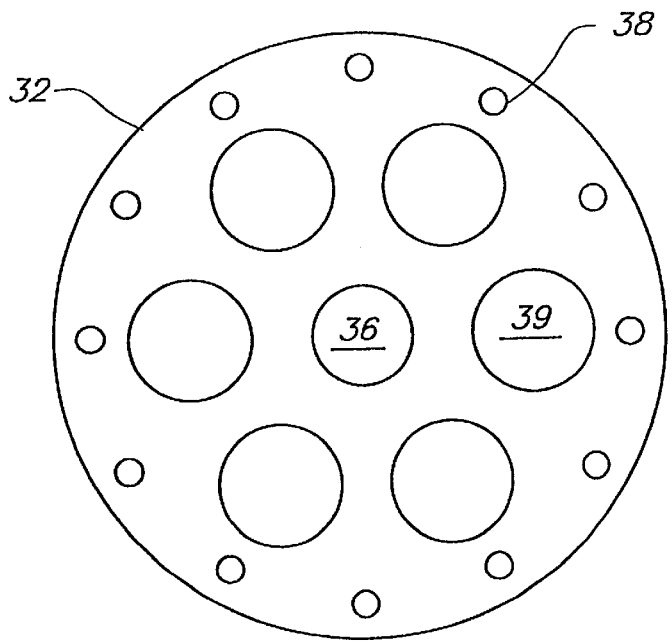
FIG. 5 is a plan view of a rotor plate according to the present invention.
Figure 6:
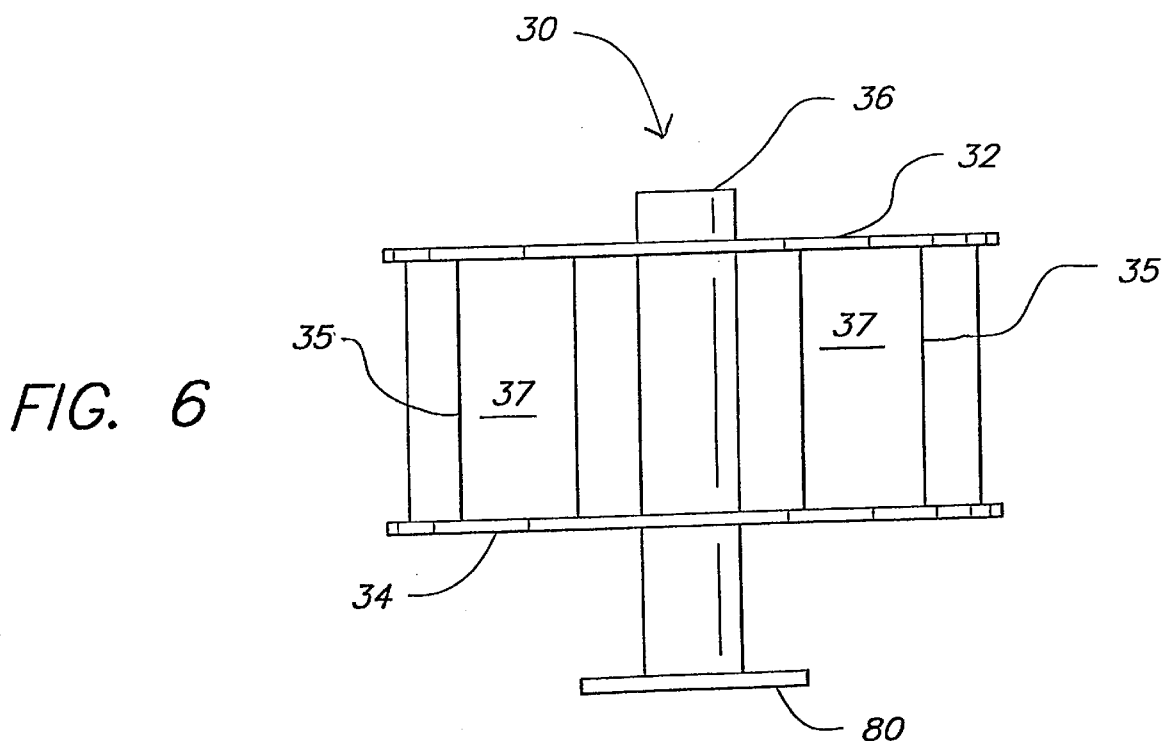
FIG. 6 is a side view of the rotor according to the present invention.

Stator plates 20 and 22 each include a bearing 26 at their center. Rotor shaft 36 extends through bearings 26 with rotor plates 32 and 34 disposed between stator plates 20 and 22 and inside the ring of stator bolts 24, so that rotor 30 is free to rotate inside stator plates 20 and 22. In operation, rotor shaft 36 is cooled by a stream of water through the hollow center of the shaft 36. Rotor 30 includes a plurality of walls 35 extending between rotor plates 32 and 34 defining a plurality of chambers 37, the rotor plates 32 and 34 having a plurality of openings 39 defined therein whereby the chambers 37 are open at top and bottom, said chambers 37 being spaced every 60° radially about the rotor beginning at 30° as shown in FIGS. 2 and 5. While the chambers 37 are shown having a cylindrical shape in the Figures, it is to be understood that the chambers 37 may have a rectangular parallelepiped shape and are sized and shaped according to the food being treated.

Upper stator plate 20 has a first insertion opening 21 defined therein at 30°, and a second insertion opening 23 defined therein at 210°, said openings being adapted for inserting the food to be treated into one of the treatment chambers 37 when the insertion openings 21 or 23 are aligned with the openings 39 in top rotor plate 32. Lower stator plate 22 has a first expulsion opening 25 defined therein at 150° and a second expulsion opening 27 at 330°, said openings being adapted for the expulsion of food from chamber 37 when expulsion openings 25 or 27 are aligned with an opening 39 in bottom rotor plate 34.

Figure 7:
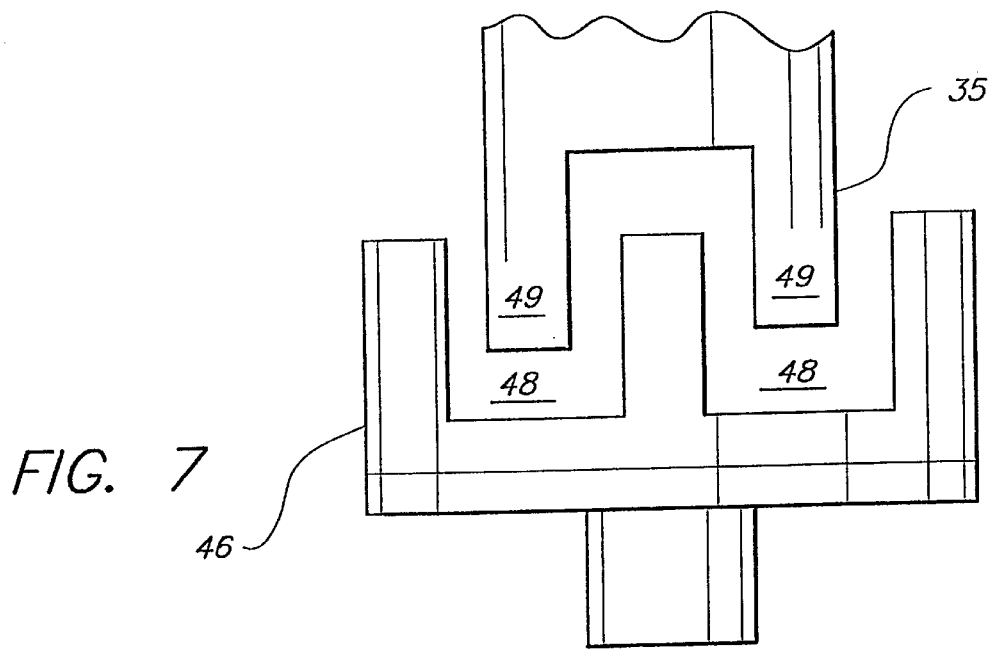
FIG. 7 is a detail view of the connection between the locking rings and the upper chamber walls of the present invention.
Figure 8:
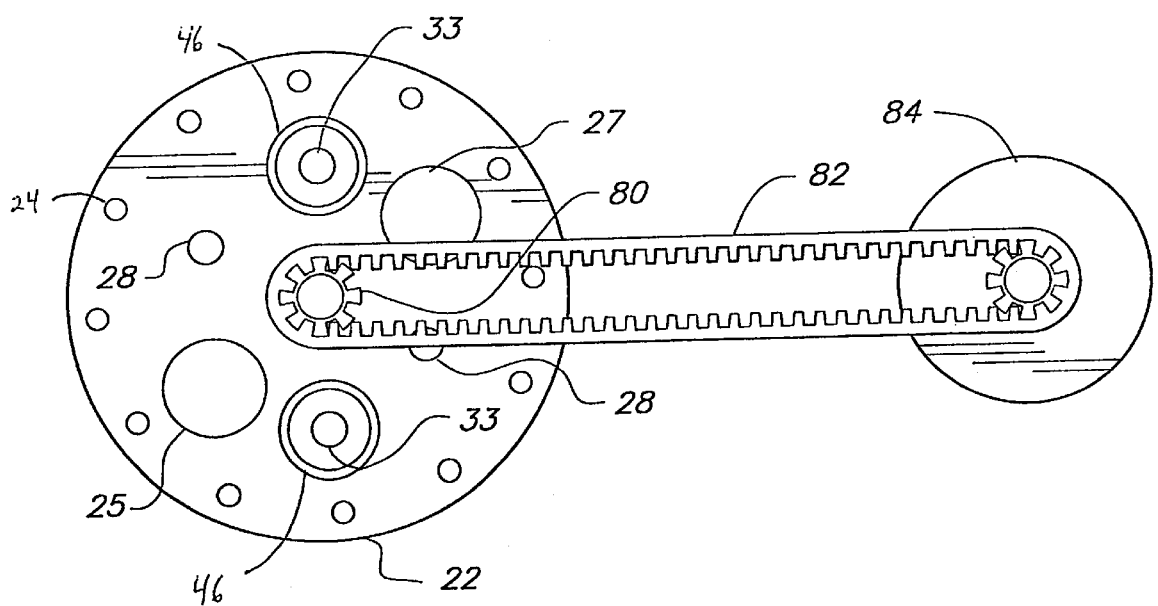
FIG. 8 is a bottom view of the rotor and stator assembly showing the roller chain and sprocket connection between the servo motor and rotor shaft of the present invention.

The apparatus includes a high pressure steam generator 40 of a type conventional in the industry. The steam generator 40 provides a source of steam at atmospheric pressure through valves 42 controlled by computer 50 to the chambers 37 at timed intervals through ports 28 in the lower stator plate 22 at positions corresponding to 30° and 210°, and through ports 29 in the upper stator plate 20 at 150° and 330°. The steam generator 40 is also connected to the chambers 37 by valves 44 controlled by the computer 50 at timed intervals through an integral reduction coupler and locking ring 46 through ports 33 in the lower stator plate 22 at 90° and 270°. The reduction coupler-locking rings 46 are raised and lowered by a pneumatic motor 60. The locking rings 46 have grooves 48 which mate with protrusions 49 at the end of the chamber walls 37, as shown in FIG. 7, so that the reduction coupler-locking rings 46 seat on the chamber walls 37 to form a gas tight seal when the locking rings 46 are raised. When the locking rings 46 are lowered, the rotor 30 and chambers 37 are free to rotate. The locking rings 46 are integral with a reduction coupler which couples the larger diameter ends of the chamber walls 35 to the smaller diameter steam pipes. The surfaces of the chamber walls 37, the lower 22 and upper 20 stator plates, and the locking rings 46 are coated with a non-stick surface treatment, such as Teflon®. The non-stick material on the chamber 37 surfaces prevents the food from sticking. The non-stick material on the locking rings 46 improves the gas tight seal.

It will be understood that the steam delivered to the chambers 37 at 30°, 210°, 150°, and 330° is at atmospheric pressure, while the steam delivered to the chambers 37 at 90° and 270° is at high pressure. For convenience, the high pressure steam generator 40 is shown as a common steam source in the drawings, although there may be separate sources of steam.

The apparatus also includes a vacuum source 70 connected to the chambers 37 by a valve 72 under computer 50 control through a reduction coupler-locking ring 46 which raises and lowers by means of pneumatic motor 60 to seat in the top of chamber walls 37 through port 31 in upper stator plate 20 at 90° and 270° at timed intervals to form a gas tight seal in the same manner as the steam connection in the bottom of the chamber 37 as described previously. The vacuum source 70 includes a condenser-receiver 74 which may be integral with, or separate from, vacuum source 70, which serves to condense steam and receive it in a reservoir, pumping any remaining air through a vacuum pump. It will be understood that while two separate high pressure steam valves 44 and two separate vacuum valves 72 are shown in the Figures, in practice there may be one high pressure steam valve and one vacuum valve, each with a plurality of branches, to simplify control by computer 50 and movement by pneumatic motor 60.

The rotor shaft 36 has a sprocket 80 about its circumference. The sprocket receives a roller chain 82 connected to a servo motor 84 which rotates the rotor 30 through predetermined angular arcs at predetermined time intervals under computer control 50. It will be understood that with some embodiments having a rotor 30 with a large moment of inertia, the roller chain 82 will be attached to a sprocket around the periphery of bottom rotor plate 34.

Figure 9:
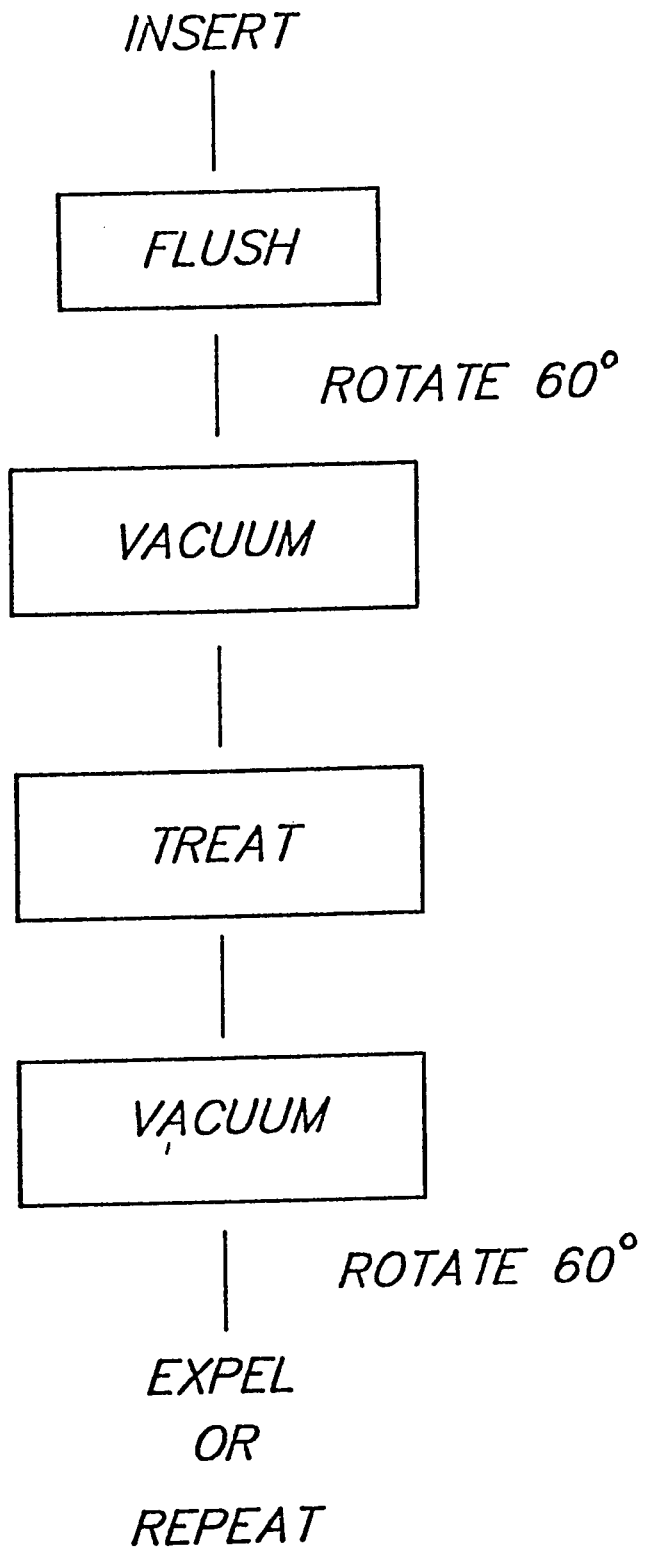
FIG. 9 is a block diagram of the treatment method applied by the apparatus of the present invention.

The general method of treating food applied by the apparatus 10, as shown in FIG. 9, will be explained briefly now, followed by specific examples of applications to particular products for particular purposes. An individual food item is inserted into a treatment chamber 37 through first insertion opening 21 at the 30° insertion position, and a second food item is simultaneously inserted into another treatment chamber 37 through second insertion opening 23 at the 210° insertion position. The food items are flushed by air-free steam through a port 28 in the lower stator plate 22 during insertion of the item. The steam valves 42 are closed and the servo motor 84 is activated by computer 50 rotate the rotor 30 and chambers 37 by 60° to the treatment position. Pneumatic motor 60 lowers a locking ring 46 connected to vacuum source 70 through ports 31 in upper stator plate 20 using large diameter tubing to quickly evacuate the treatment chamber 37 for a timed interval, removing the flush steam by rapid evaporation under vacuum, and vacuum valves 72 are closed. Pneumatic motor 60 having previously raised locking rings 46 through ports 33 in lower stator plate 22, the valve 44 opens and the treatment chamber 37 is quickly brought up to the pressure of the air-free treatment gas, in this case delivered by high pressure steam generator 40. After a prescribed computer 50 controlled treatment time, the program closes steam valves 44 and opens vacuum valves 72 to cool the food for a timed interval by evacuating the treatment chamber 37. After the prescribed cooling time, pneumatic motor 60 withdraws locking rings 46 from the top and bottom of the treatment chamber 37 and servo motor 84 rotates the rotor by 60° to the expulsion position. The food items then fall through expulsion openings 25 and 27 at 150° and 330°, receiving positive assistance by a steam flow through ports 29 in upper stator plate 20. The program then stops the expelling steam, rotates the rotor 30 by 60°, opens the flush valves and receives new food items in the insertion openings as a new treatment cycle begins.

If the primary treatment purpose is killing surface microorganisms, the air-free treatment gas may be one of the following: steam, propylene oxide, hydrogen peroxide, chlorine, or ozone. If the primary treatment purpose is firming the surface layer over a sensitive interior, or weakening the surface layer over a sensitive interior in order to more easily remove the surface layer, then the air-free treatment gas used is steam.

The operation of the apparatus is more fully described in the following examples. It will be understood that the examples are not intended by way of limitation, but merely to illustrate the method of use, the apparatus and method being applicable to other foods and ingestible items.

EXAMPLES

Example 1

The steam generator 40 has been charged with deionized water, and boiled at atmospheric pressure for 30 minutes to degas the boiling water. The steam generator is set at 300° F. (52 psig). The time of the treatment cycle is set for 1.0 seconds. A broiler chicken carcass which has had its blood, feathers, head, feet and internal organs removed and which has been chilled to 40° F. has about $10^7$ living bacteria freshly applied to the surface of one leg.

The carcass is inserted into the apparatus 10 through insertion opening 21 or 23 (the apparatus treats two carcasses per revolution) and flushed with atmospheric pressure steam. At time 0.0 the chamber wall 35 is at 140° F. because of cooling water inside the rotor shaft 30. At time 0.2 seconds the treatment chamber has rotated 60° to the treatment position and the locking rings 46 have sealed the top and bottom of the chamber 37. At time 0.4 seconds, the chamber has been evacuated to a pressure of 20 millibars. At time 0.6 seconds, the chamber has been filled with 300° F. steam. At time 0.8 seconds the chamber has again been evacuated to 20 millibars pressure. At time 1.0 seconds, the chamber 37 has again rotated 60° to the expulsion position, and the carcass is removed with expelling steam through expulsion port 25 or 27, while simultaneously two other carcasses are being inserted through the insertion openings 21 and 23 and two more carcasses are in the treatment position. The meat surface is again at 40° F. due to the evaporative cooling in the final vacuum step.

The expelled carcass appears fresh and uncooked. The inoculated leg is treated with peptone, and the peptone is plated onto tryptose agar and incubated for 24 hours. Counting the colony forming units then shows that the $10^7$ organisms have been reduced by treatment to $10^4$ organisms.

Example 2

The same apparatus as Example 1 is used. Time of the treatment cycle is set at 2.0 seconds. The steam generator 40 is set at 280° F. (35 psig). Another broiler carcass inoculated as in Example 1 is used. At time 0.0, the carcass is still in the insertion position, having been flushed with steam at atmospheric pressure for the previous 2 seconds. At time 0.2 seconds the chamber 37 has rotated 60° to the treatment position and locking rings 46 have sealed the top and bottom of the chamber 37. At time 0.4 seconds the chamber 37 has been evacuated to 20 millibars of pressure. At time 1.4 seconds the chamber has been filled with 280° F. steam. At time 1.8 seconds the chamber 37 has been evacuated to 20 millibars of pressure. At time 2.0 seconds the chamber has been rotated 60° to the expulsion position and the carcass is being expelled with a positive steam flow. The carcass appears mainly uncooked, but with slight cooking on thin areas. The inoculated leg is evaluated as before. The original $10^7$ organisms have been reduced to $10^2$ organisms.

It can now be seen why the order of the steps of the first evacuation of the chamber 37 and flushing the surface of the food are reversed in the present apparatus 10 as compared to previous U.S. Pat. No. 5,281,428. The purpose of flushing the carcass with steam as set forth in the '428 patent is to further remove air near the surface of the carcass in order to treat the carcass with air-free treatment gas more quickly, so that surface microorganisms are more effectively killed without cooking the carcass.

In the present invention, the carcass is flushed with steam during insertion of the carcass in order to remove most of the air around the carcass before the chamber is sealed. The flush may, or may not, improve the treatment step. But, because of the shape of the carcass, nine or more additional carcass volumes of air are admitted to the chamber 37 than is admitted without flushing. It is expensive to remove all of this air during the first evacuation step. The air at atmospheric pressure (a little more than 1 bar) would have to be removed to reduce the pressure to 20 millibars, a 50 fold reduction in volume, in 0.2 seconds, a prodigious pumping rate at the expected processing rate of 7200 carcasses per hour, as in Example 1, probably leading to frequent wear and tear and equipment breakdowns. By flushing the carcass with steam during insertion, the steam may be removed from the chamber 37 aided by the thermodynamic flow of hot steam to the cold condenser and condensate receiver 74, a very rapid evaporation of the flushing steam under vacuum, leaving the small volume of air remaining to be removed by the vacuum pump 70.

If the desired degree of sterilization is not achieved at the 7200 carcass per hour rate of Example 1, the treatment time may be doubled as in Example 2. While the processing rate is halved to 3600 carcasses per hour, there is an evident savings in machine wear and tear.

Example 3

The same apparatus 10 is used. The time of the treatment cycle is set at 7.0 seconds. The steam generator 40 is set at 350° F. (121 psig). The chamber 37 is filled with unprocessed, dry dent field corn. The corn is treated with steam for 3.0 seconds and cooled by vacuum for 3.0 seconds. On removal, the colored bran was seen loosened, but not removed from the kernel. After short, gentle rubbing between the hands, the bran was easily removed, leaving yellow kernels intact. The germ could be picked off the kernel, apparently intact. The separation seemed ideal for corn refining.

Example 4

The same apparatus 10 is used. The time of the treatment cycle is set at five seconds. The steam generator 40 is set at 220° F. (2 psig). The chamber 37 is filled with firm, intact, unprocessed strawberries with caps and stems. The strawberries are steam treated at 220° F. for one second and vacuum treated for one second. On removal, the strawberries appeared intact. They tasted raw, and after resting regained their natural aroma. The berries were gently washed with peptone solution, plated on agar, and incubated for 24 hours. The treated samples showed $10^4$ fewer organisms than untreated berries, although the original levels were variable.

Example 5

The same apparatus 10 and treatment conditions used in Example 4 are applied to fresh pod peas which have been gently removed from their pods. The treated peas seem unchanged in appearance and taste. Treated and untreated peas were quickly enclosed in dry, capped glass jars. The untreated peas spoiled completely within two days stored at 90° F. The treated peas seem good with respect to color, odor, texture and taste after ten days at 90° F.

Example 6

The same apparatus 10 is used. The treatment cycle is set for two seconds. The steam generator 40 is set at 250° F. (15 psig). The chamber 37 is filled with fresh romaine lettuce leaves which have been wetted with egg albumen solution. The treated leaves emerge completely coated with colorless, nearly transparent, gelled albumen. The leaves remained green and turgid for ten days at 40° F. No browning of the stem ends at all was observed.

It is to be understood that the present invention is not limited to the embodiments described above, but encompasses any and all embodiments within the scope of the following claims. For example, an apparatus for treating 7200 broiler chickens per hour might have six cylindrical chambers 37 ten inches in diameter, 14 inches high, with two insertion positions, two treatment positions and two expulsion positions in a 36 inch diameter rotor rotating in 60° arcs. For a 10,800 broiler per hour machine, there may be nine chambers with three insertion positions, three treatment positions, and three expulsion positions in a 46 inch diameter rotor rotating in 40° arcs. For larger carcasses such as turkey, there may be six chambers 16 inches in diameter, 20 inches high in a 48 inch rotor. For trays of raw meat, the treatment chambers may be rectangular chambers three inches high with rectangular locking rings, etc.

I claim:

1. An apparatus for treating raw food with an air-free treatment gas in a vacuum created by a vacuum source including a rotor and stator assembly, the rotor rotating through at least one treatment cycle having an insertion position, a treatment position, and an expulsion position, the rotor and stator assembly comprising:
   a) a circular rotor having a plurality of treatment chambers defined therein, said treatment chambers having walls defining the sides of the treatment chamber and defining an opening at the top of the treatment chamber and an opening at the bottom of the treatment chamber, the treatment chamber being adapted for completely enclosing the raw food during treatment, the rotor having an integral hollow water-cooled rotor shaft extending through the center of the rotor;
   b) a circular stator having an upper stator plate and a lower stator plate, the rotor shaft concentric with and extending through the stator, said stator plates abutting the rotor, the rotor being disposed between the upper and lower stator plates whereby the rotor rotates through the at least one treatment cycle between said plates;
   c) insertion means for inserting and receiving the raw food in one of said plurality of treatment chambers at the insertion position;
   d) flushing means for flushing the surface of the raw food with the air-free treatment gas during insertion of the raw food at the insertion position;
   e) evacuation means for evacuating said treatment chamber at the treatment position;
   f) treatment means for treating the raw food with air-free treatment gas at the treatment position;
   g) expulsion means for expelling the raw food from the treatment chamber at the expulsion position; and wherein
   h) the rotor rotates through the at least one treatment cycle so rapidly that the interior of the raw food is substantially unaffected by treatment.

2. The apparatus for treating raw food according to claim 1, wherein said insertion means includes an opening defined in said upper stator plate, the opening in the upper stator plate being registered with the opening in the top of the treatment chamber when the rotor is at the insertion position, the openings being adapted for receiving the raw food.

3. The apparatus for treating raw food according to claim 2, wherein said flushing means comprises air-free steam at atmospheric pressure and a port in the lower stator plate at the insertion position for introducing said air-free steam into said treatment chamber at timed intervals.

4. The apparatus for treating raw food according to claim 3, wherein said evacuation means includes a vacuum source and a condenser and a condensate receiver removably connected to said treatment chamber at the treatment position at timed intervals.

5. The apparatus for treating raw food according to claim 4, wherein said treatment means comprises a source of air-free treatment gas removably connected to said treatment chamber at the treatment position at timed intervals.

6. The apparatus for treating raw food according to claim 5, further comprising a sealing means wherein said evacuation means and said treatment means are removably connected to said treatment chamber by said sealing means providing a gas-tight seal to said treatment chamber.

7. The apparatus for treating raw food according to claim 6, wherein said sealing means comprises non-stick material coated protrusions at the ends of said treatment chamber walls and mating non-stick material coated grooves on a reduction coupler-locking ring connected to said evacuation means, said evacuation means being removably connected to the top of said treatment chamber through an opening defined in the upper stator plate at the treatment position at timed intervals, and on a second reduction coupler-locking ring connected to said treatment means, said treatment means being connected to said treatment chamber through an opening in the lower stator plate at the treatment position at timed intervals.

8. The apparatus for treating raw food according to claim 7, wherein said expulsion means includes an opening in the lower stator plate at the expulsion position, air-free steam at atmospheric pressure, and a port in the upper stator plate for introducing a stream of said air-free steam into the treatment chamber at the expulsion position at timed intervals, whereby said stream of air-free steam positively expelling the raw food from said treatment chamber.

9. The apparatus for treating raw food according to claim 8, wherein the surface of each treatment chamber wall, the bottom surface of the upper stator plate and the top surface of the lower stator plate are coated with non-stick material.

10. A method of using the apparatus for treating raw food according to claim 1, comprising the steps of:
   a) inserting an item of raw food in one of the plurality of treatment chambers;
   b) flushing the surface of the raw food with air-free steam at atmospheric pressure;
   c) rotating the treatment chamber containing the raw food item to a treatment position;
   d) sealing the bottom of the treatment chamber containing the raw food item with a reduction coupler-locking ring connected to a source of air-free treatment gas;
   e) sealing the top of the treatment chamber containing the raw food item with a reduction coupler-locking ring connected to a vacuum source and condenser and condensate receiver;
   f) evacuating the treatment chamber containing the raw food item for a timed interval in order to remove the flushing steam by evaporation under vacuum;
   g) treating the raw food item by introducing an air-free gas into the treatment chamber for a timed interval;
   h) evacuating the treatment chamber for a timed interval in order to remove the air-free treatment gas;
   i) disconnecting the reduction coupler-locking rings from the top and bottom of the treatment chamber containing the raw food item;
   j) rotating the treatment chamber containing the raw food item to an expulsion position;
   k) expelling the raw food item from the treatment chamber with the aid of a stream of air-free steam for a timed interval; and l) rotating the treatment chamber to an insertion position in order to begin a new treatment cycle.

11. A method of treating raw food according to claim 10, wherein the step of treating the raw food with an air-free treatment gas is performed for a length of time and terminated under a sufficiently low vacuum in order to kill substantial numbers of surface microorganisms without substantially affecting the interior of the raw food, thereby killing surface microorganisms.

12. The method for treating raw food according to claim 10, wherein the step of treating the item is performed for a length of time and terminated under a sufficiently low vacuum in order to provide the item with a firm surface layer without substantially affecting the interior of the item.

13. The method of treating raw food according to claim 10 wherein the step of treating the raw food is performed for a length of time and terminated under a sufficiently low vacuum in order to remove a surface layer from the item of raw food without substantially affecting the interior of the raw food.

14. The method for treating raw food according to claim 10, wherein said air-free treatment gas utilized in step (g) is selected from the group consisting of propylene oxide, hydrogen peroxide, ozone, chlorine, and a thermally saturated, air-free steam.

15. The method for treating raw food according to claim 10, wherein the rotor rotates through a plurality of treatment cycles comprising steps (a) through (l) in one complete revolution.

* * * * *